(12) United States Patent
Suzuki et al.

(10) Patent No.: US 9,863,389 B2
(45) Date of Patent: Jan. 9, 2018

(54) CONTROL UNIT FOR A MULTI-CYLINDER INTERNAL COMBUSTION ENGINE

(71) Applicant: TOYOTA JIDOSHA KABUSHIKI KAISHA, Toyota-shi, Aichi-ken (JP)

(72) Inventors: Yusuke Suzuki, Hadano (JP); Susumu Kojima, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 94 days.

(21) Appl. No.: 15/066,085

(22) Filed: Mar. 10, 2016

(65) Prior Publication Data

US 2016/0265500 A1    Sep. 15, 2016

(30) Foreign Application Priority Data

Mar. 11, 2015 (JP) ................................ 2015-048430

(51) Int. Cl.
| | |
|---|---|
| *F02N 11/08* | (2006.01) |
| *F02D 17/04* | (2006.01) |
| *F02N 99/00* | (2010.01) |
| *F02P 5/15* | (2006.01) |

(Continued)

(52) U.S. Cl.
CPC .......... *F02N 11/0825* (2013.01); *F02D 17/04* (2013.01); *F02N 99/004* (2013.01); *F02N 99/006* (2013.01); *F02P 5/1506* (2013.01); *F02B 23/104* (2013.01); *F02N 11/0818* (2013.01); *F02P 3/04* (2013.01); *F02P 3/0407* (2013.01); *Y02T 10/46* (2013.01)

(58) Field of Classification Search
CPC .. F02N 11/0825; F02N 99/004; F02N 99/006; F02D 17/04; F02P 5/1506

USPC ............................ 123/299, 304, 179.4, 179.3
See application file for complete search history.

(56) References Cited

U.S. PATENT DOCUMENTS

| | | | | |
|---|---|---|---|---|
| 2004/0149247 | A1* | 8/2004 | Kataoka ................ | F02N 11/006 123/179.4 |
| 2005/0109302 | A1* | 5/2005 | Tetsuno ................ | F02D 41/042 123/179.5 |
| 2015/0096535 | A1* | 4/2015 | Kitano .................. | F02D 41/065 123/406.53 |

FOREIGN PATENT DOCUMENTS

| | | |
|---|---|---|
| JP | 2008-274821 A | 11/2008 |
| JP | 2013-174169 A | 9/2013 |

* cited by examiner

*Primary Examiner* — Mahmoud Gimie
(74) *Attorney, Agent, or Firm* — Andrews Kurth Kenyon LLP (57) ABSTRACT

A control unit according to the present invention performs an automatic stop control in which an injection of fuel from a fuel injection valve is stopped to stop a rotation of an engine when an automatic stop condition is satisfied. Furthermore, the control unit performs a first injection, in which fuel is injected from the fuel injection valve of a cylinder in an expansion stroke, and an ignition operation for igniting the fuel injected by the first injection, when a restart demand occurs after an initiation of the automatic stop control. In addition, the control unit performs a second injection, in which fuel is injected from the fuel injection valve of a cylinder in a compression stroke, and an ignition operation for igniting the fuel injected by the second injection. Then, the control unit performs a third injection, in which fuel is injected from the fuel injection valve of a cylinder in a compression stroke, when it judges that a start-up failure for which a crank angle of the cylinder which is in the compression stroke after the second injection cannot get over the compression top dead center occurs or will occur.

3 Claims, 8 Drawing Sheets

(51) Int. Cl.
  *F02B 23/10*   (2006.01)
  *F02P 3/04*    (2006.01)

CONTROL UNIT FOR A MULTI-CYLINDER INTERNAL COMBUSTION ENGINE

CROSS-REFERENCE TO RELATED APPLICATION

The present application claims priority to Japanese Patent Application No. 2015-048430 filed on Mar. 11, 2015, which is incorporated herein by reference in its entirety.

TECHNICAL FIELD

The present invention relates to a control unit having functions to automatically stop and automatically restart a multi-cylinder internal combustion engine (hereafter, may be simply referred to as an "engine").

BACKGROUND ART

Conventionally, a control unit which performs an automatic-stop control in which the operation (rotation) of an engine is automatically stopped when a predetermined automatic-stop condition is satisfied, for the purpose of improvement of fuel consumption in a vehicle carrying the engine and reduction of the quantity of exhaust gas discharged from the vehicle, etc. has been known.

Such a control unit automatically restarts the engine, when a restart demand of the engine occurs as in a case where an accelerator operation is made or a brake operation is released. In this case, the control unit performs either one of (1) usual control, (2) ignition start-up control, and (3) starter start-up control, depending on the engine rotational speed at the time of the occurrence of the restart demand, to restart the engine, for instance.

By the way, the ignition start-up control is performed when the engine rotational speed has fallen to a level in which it is difficult to restart the engine by the usual control (a fuel injection and an ignition in a compression stroke) although the engine rotational speed has not yet reached "0" completely. In accordance with the ignition start-up control, a fuel injection and an ignition are performed in a cylinder in an expansion stroke (hereafter, may be referred to as an "expansion stroke cylinder") so that a cylinder in a compression stroke (hereinafter, may be referred to as a "compression stroke cylinder") can get over the top dead center of the cylinder. Furthermore, in the ignition start-up control, a fuel injection and an ignition in this expansion stroke cylinder are carried out at least once or more, and, in addition to the above, fuel injection is performed one by one also to a compression stroke cylinder so that the rotational speed of the engine goes up promptly, and electrification to an igniter is started in order to perform an ignition after the cylinder reaches the compression top dead center.

By the way, in the ignition start-up control, there is a possibility that the compression stroke cylinder cannot get over the top dead center of the cylinder and thereby the engine may begin a negative rotation (inverse rotation) even though a fuel injection and an ignition in the expansion stroke cylinder are performed. Namely, a start-up failure may occur. In this case, when an interception of the electrification to an igniter is performed in the compression stroke cylinder in which a fuel injection has been already made, there is a possibility that fuel may burn to promote the negative rotation of the engine although the cylinder is still in a compression stroke. Then, one of conventional controllers is configured to postpone an execution of an ignition in the compression stroke cylinder in which fuel injection has been already performed as well as to drive a starter, and to perform an ignition at a time point when the compression stroke cylinder get over the compression top dead center and results in an expansion stroke, in a case where the engine begins a negative rotation (for instance, refer to Japanese Patent No. 5,456,088 (JP 5,456,088 B2)).

SUMMARY OF INVENTION

However, even in a case where an ignition in a compression stroke cylinder is delayed as mentioned above, the fuel-air mixture containing the fuel injected to the compression stroke cylinder has stayed in the compression stroke cylinder and, as a result, it has received heat from the wall surface of a combustion chamber for a long time and has become an elevated temperature. Therefore, there was an issue that a negative rotation occurred again and initiation of the start-up was delayed due to a hypergolic ignition (self-ignition) of the fuel-air mixture occurred when the direction of rotation of the engine changes to a positive rotation due to an aftershock and the fuel-air mixture is compressed. Furthermore, it was found that that such a self-ignition may occur not only when an engine positively rotates due to an aftershock, but also when an engine is positively rotated by a starter.

The present invention has been conceived in order to cope with the above-mentioned issue. Namely, the objective of the present invention is to provide a controller (control unit) which can suppress a self-ignition of a fuel-air mixture containing fuel injected to an expansion stroke cylinder and can perform a subsequent start-up of an engine at an early stage even in a case where a start-up failure occurs in an ignition start-up control.

A control unit for a multi-cylinder internal combustion engine according to the present invention (hereafter, referred to as a "present invention unit") is applied to a multi-cylinder internal combustion engine comprising, for each cylinder, a fuel injection valve for direct injection of fuel to a combustion chamber and an ignition device for generating a spark for an ignition in said combustion chamber.

The present invention unit comprises a control part for performing an automatic stop control in which an injection of fuel from said fuel injection valve to stop the rotation of said engine, when a predetermined automatic stop condition is satisfied.

Furthermore, the control part restarts said engine by performing an ignition start up control which will be mentioned below, when a restart demand occurs after the initiation of said automatic stop control.

Namely, the ignition start-up control is a control performed when a restart demand occurs after the initiation of said automatic stop control, wherein:

(1) a first injection is performed to inject fuel from said fuel injection valve of a cylinder in an expansion stroke and subsequently said ignition device is used to generate a spark for ignition for igniting the fuel injected by the first injection to the combustion chamber of the cylinder in the expansion stroke, and (2) a second injection is performed to inject fuel from said fuel injection valve of a cylinder in a compression stroke and subsequently said ignition device is used to generate a spark for ignition for igniting the fuel injected by the second injection, at or after a time point when the cylinder gets over the top dead center.

Thus, the control part burns a fuel-air mixture in the expansion stroke cylinder by the fuel injection (first injection) and the ignition in the expansion stroke cylinder so that the compression stroke cylinder can get over the compression top dead center. Furthermore, the control part needs to perform the fuel injection (second injection) also in the compression stroke cylinder and form the fuel-air mixture in order to ignite and burn fuel at or after a time point when the cylinder gets over the top dead center so that a start-up torque (torque required for restart) can be generated after the compression stroke cylinder gets over the compression top dead center.

However, as mentioned above, when the start-up failure that the compression stroke cylinder cannot get over the top dead center occurs after performing the second injection in the compression stroke cylinder, since the fuel-air mixture formed by the second injection stays for a long time in the combustion chamber of the compression stroke cylinder, the temperature of the fuel-air mixture becomes high. Therefore, when the engine positively rotates after a negative rotation, or when the engine is positively rotated by a starter, the fuel-air mixture is compressed and there is a possibility of self-ignition.

Then, said control part is configured to perform a third injection to re-inject fuel from said fuel injection valve of a cylinder in said compression stroke after said second injection so that a self-ignition of fuel-air mixture in the cylinder in the compression stroke is suppressed, more preferably, so that a self-ignition of fuel-air mixture does not occur in the cylinder in the compression stroke, when it is judged that a start-up failure in which the crank angle of the cylinder in the compression stroke cannot get over the compression top dead center has occurred or will occur.

Due to the fuel injected by this third injection, since the fuel-air mixture formed in the compression stroke cylinder becomes excessively rich (excessively thick, over-rich), even if it is a case where the fuel-air mixture is compressed by the positive rotation of the engine after its negative rotation or the subsequent cranking using a starter, a self-ignition of the fuel-air mixture is suppressed. As a result, since a further negative rotation of the engine by a self-ignition burning of the fuel-air mixture is suppressed, the engine can be started up at an early stage.

In one aspect of the present invention unit, said ignition device comprises a primary coil, a secondary coil and a spark plug, and is configured to generate said spark for ignition by impressing a high voltage produced in said secondary coil by electrification to said primary coil and interception thereof to an electrode part of said spark plug, and said control part is configured to intercept the electrification to the primary coil after a predetermined time has passed since said third injection was performed, in a case where the electrification to said primary coil has been already started in order to generate said spark for ignition for igniting the fuel injected by said second injection at a time point when it is judged that said start-up failure has occurred or will occur.

In accordance with this, electrification to the primary coil may be intercepted at a time point when the fuel injected by the third injection is sufficiently evaporated and mixed with the fuel-air mixture formed based on the fuel injected by the second injection. At such a time point, a "sufficiently excessively thick fuel-air mixture", which is hard to be ignited even when a spark for ignition occurs, has been formed in the compression stroke cylinder. As a result, since it is hard to generate burning by the spark for ignition, it is hard to generate the further negative rotation of the engine. As a result, a subsequent start-up of the engine can be performed at an early stage. Furthermore, since electrification to the primary coil can be intercepted as much as possible at an early stage, a protection of an ignition device can be intended.

In one mode of this invention device, said control part is configured to perform a starter start-up control in which cranking of said engine is carried out by a starter that said engine comprises, as well as, fuel is injected from said fuel injection valve, the injected fuel is ignited by a spark for ignition generated by said ignition device, and the engine is restarted, when it is judged that said start-up failure has occurred or will occur.

Thereby, even if it is a case where the start-up by ignition start-up control is not successful, an engine can be restarted at an early stage using a starter.

In this case, the above-mentioned controller is further configured so as to decrease the quantity of fuel injected from said fuel injection valve in a predetermined period in a case where there is a history that said third injection has been performed, as compared with that in a case where there is no such a history, after said engine has completed its start-up after the execution of said starter start-up control.

Since an excessively thick fuel-air mixture has been formed in the compression stroke cylinder by the above-mentioned third injection, there is a possibility that the excessively thick fuel-air mixture may flow into a catalyst disposed in an exhaust passage when the starter start-up control is performed and this may result in an excessively rich status of the catalyst (namely, a status that the catalyst cannot purify unburned fuel any longer). Therefore, as the above-mentioned configuration, the quantity of fuel injected from said fuel injection valve is decreased in a predetermined period in a case where there is a history that said third injection has been performed, as compared with that in a case where there is no such a history. As a result of this, since the status of the catalyst does not become excessively rich, unburned fuel discharged from the engine is purified by the catalyst. As a result, the quantity of the unburned fuel discharged in an atmosphere can be reduced.

Other objective, other features and accompanying merits of the present invention will be easily understood from the following explanation about each embodiment of the present invention which will be described referring to drawings.

DESCRIPTION OF EMBODIMENTS

Hereafter, a "control unit for a multi-cylinder internal combustion engine" according to an embodiment of the present invention (hereafter, may be referred to as the "present unit") will be explained.

(Configuration)

Figure 1:
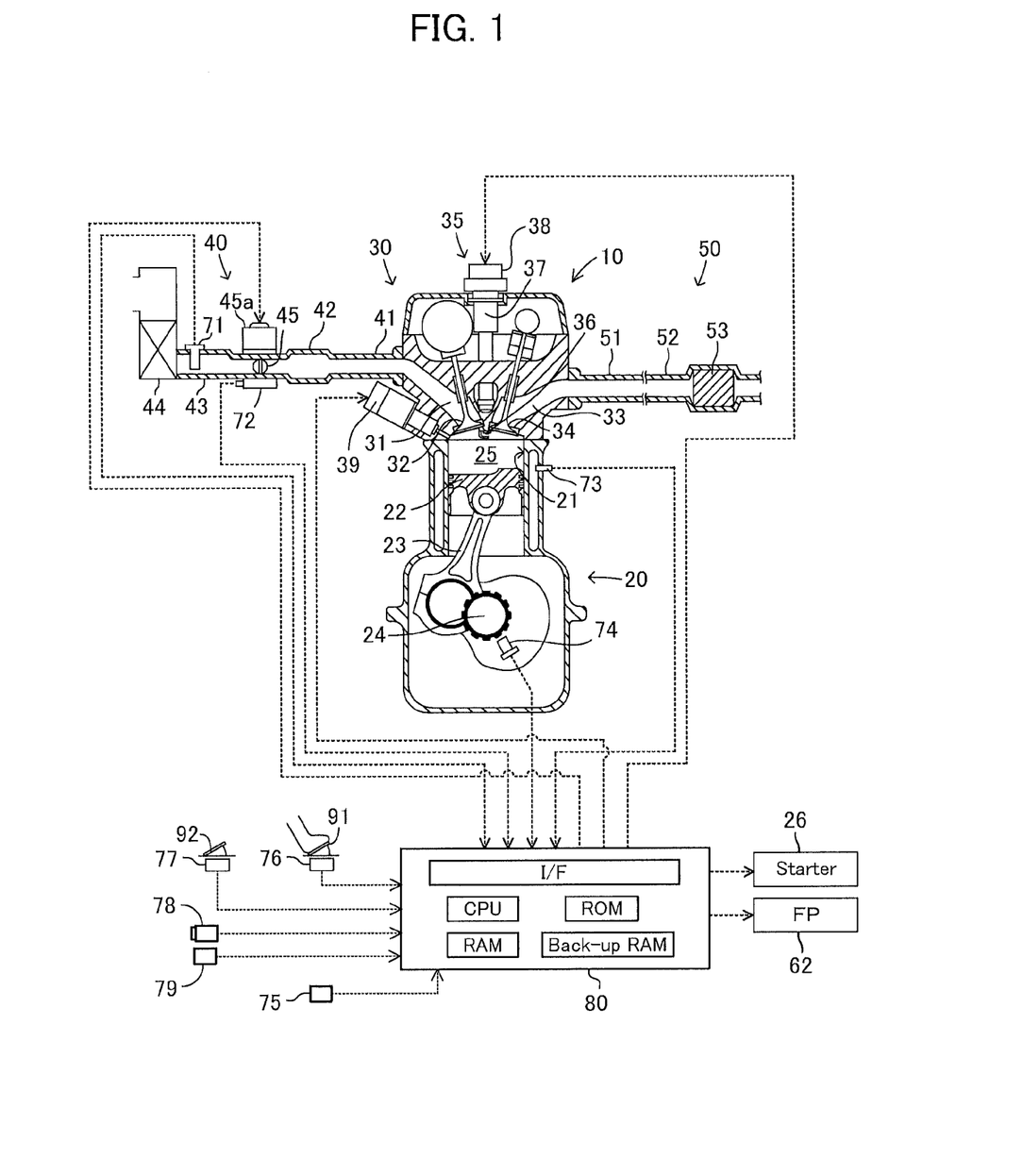
FIG. 1 is a schematic diagram of a "control unit for a multi-cylinder internal combustion engine" according to an embodiment of the present invention and a multi-cylinder internal combustion engine to which the control unit is applied.

The present unit is applied to an internal combustion engine (engine) 10 shown in FIG. 1. The engine 10 is a multi-cylinder (in this example, in-line four cylinder) four-cycle piston-reciprocating cylinder-injection (direct-injection) spark-ignited gasoline-fuel engine.

The engine 10 comprises a cylinder block part 20 including a cylinder block, a cylinder block lower case and an oil pan, etc., a cylinder head part 30 fixed on the cylinder block part 20, an intake system 40 for supplying air to the cylinder block part 20, and an exhaust system 50 for emitting exhaust gas from the cylinder block part 20 to the outside.

The cylinder block part 20 comprises a cylinder 21, a piston 22, a connecting rod 23 and a crankshaft 24. The piston 22 reciprocates inside of the cylinder 21. It is configured so that the reciprocation of the piston 22 is transmitted to the crankshaft 24 through the connecting rod 23 and, thereby, the crankshaft 24 rotates. The cylinder 21, the piston 22 and the cylinder head part 30 form a combustion chamber (cylinder) 25.

The cylinder block part 20 comprises a starter motor (may be simply referred to as a "starter") 26. The starter 26 is configured to operate in response to an instruction from an engine ECU (Electronic Control Unit) 80 which will be mentioned later and rotate a ring gear (not shown) attached to the crankshaft 24. Namely, the starter 26 performs a cranking.

The cylinder head part 30 comprises an intake port 31 which is communicated with the combustion chamber 25, an intake valve 32 which opens and closes the intake port 31, an exhaust port 33 which is communicated with the combustion chamber 25, an exhaust valve 34 which opens and closes the exhaust port 33, an ignition device 35 which ignites fuel in the combustion chamber 25 and a fuel injection valve 39 which directly injects fuel into the combustion chamber 25.

The ignition device 35 comprises a spark plug 36, an ignition coil 37 and an igniter 38 which generate high voltage to be given to the spark plug 36. An electrode part (spark generation part for ignition) of the spark plug 36 is exposed to the combustion chamber 25 in a central part of an upper part of the combustion chamber 25.

Figure 2:
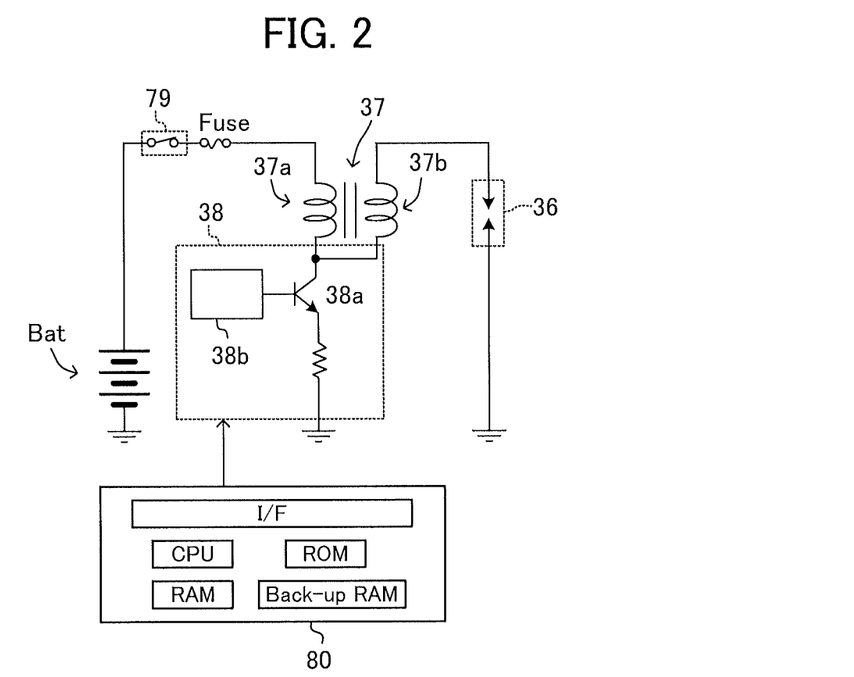
FIG. 2 is a circuit diagram of an ignition device shown in FIG. 1.

As shown in FIG. 2, a primary side coil 37a of the ignition coil 37 is connected to a battery Bat of a vehicle through a fuse and an ignition switch 79. As for a secondary coil 37b of the ignition coil 37, its one end is connected to the primary side coil 37a, and the other end is connected to the spark plug 36. The igniter 38 comprises a switching element (power transistor) 38a and a drive circuit 38b. The drive circuit 38b puts the switching element 38a in an electrically connected status in response to a control signal from the ECU 80, and electrifies the primary side coil 37a. The drive circuit 38b changes the switching element 38a from an electrical connection status into a non electrical connection status in response to a control signal from the engine ECU 80. Namely, electrification to the primary side coil 37a is intercepted. At this time, high voltage occurs in the secondary coil 37b, and the high voltage is impressed to the spark plug 36. As a result, a spark for ignition occurs from an electrode part of the spark plug 36.

Referring to FIG. 1 again, the fuel injection valve 39 is disposed in the cylinder head part 30 so that its fuel injection hole is exposed in the combustion chamber 25. The fuel injection valve 39 opens in response to an instruction of the ECU 80, and directly injects fuel into the combustion chamber 25.

The intake system 40 comprises an intake manifold 41 communicated with the intake port 31, a surge tank 42 communicated with the intake manifold 41, and an intake pipe 43 whose one end is connected to the surge tank 42. The intake port 31, the intake manifold 41, the surge tank 42, and the intake pipe 43 constitute an intake passage.

Furthermore, the intake system 40 comprises an air filter 44 and a throttle valve 45. The throttle valve 45 is supported by the intake pipe 43 in a rotatable manner. The throttle valve actuator 45a consists of a DC motor, and changes the opening of the throttle valve 45 by driving the throttle valve 45 in response to an instruction of the ECU 80.

The exhaust system 50 comprises an exhaust manifold 51 communicated with the exhaust port 33 and an exhaust pipe 52 connected to the exhaust manifold 51. The exhaust port 33, the exhaust manifold 51 and the exhaust pipe 52 constitute an exhaust passage.

Furthermore, the exhaust system 50 comprises a three-way catalyst (a three-way catalytic converter, an exhaust-air-purification catalyst) 53. The three-way catalyst 53 is disposed in the exhaust pipe 52, and has a function to reduce NOx (nitrogen oxide) while oxidizing unburned components of HC, CO and H2, etc. when the air fuel ratio of gas flowing into a combustion chamber is the theoretical air fuel ratio. The three-way catalyst 53 has an oxygen occlusion function to occlude (store) oxygen, and can purify the unburned components and NOx by this oxygen occlusion function even when the air fuel ratio shifts from the theoretical air fuel ratio.

The engine 10 comprises a fuel pump system 62. The fuel pump system 62 comprises "a low-pressure pump, a high-pressure pump and an electromagnetic valve for fuel pressure adjustment" which are not shown. The fuel pump system 62 pumps up fuel from a fuel tank with a fuel pump, which are not shown, and supplies the fuel to the fuel injection valve 39 after adjusting the pressure of the fuel to a target fuel pressure in response to an instruction of the ECU 80.

The ECU 80 is an electronic circuit including a well-known microcomputer, and it includes a CPU, a ROM, a RAM, a backup RAM and an interface, etc. The ECU 80 is connected with sensors which will be mentioned below, and receives (is inputted) signals from these sensors.

An air flow meter 71: This measures the mass flow rate (intake air mass Ga) of air which passes through the intake pipe 43 and is inhaled into the engine 10, and outputs a signal representing this intake air mass Ga.

A throttle position sensor 72: This detects the opening of the throttle valve 45 (throttle valve opening TA), and outputs a signal representing this throttle valve opening TA.

A water temperature sensor 73: This measures a temperature of cooling water which cools the engine 10 (cooling water temperature THW), and outputs a signal representing this cooling water temperature THW.

A crank angle sensor 74: This generates one pulse signal whenever the crankshaft 24 rotates a certain angle (for instance, 10 [deg.]). The ECU 80 acquires a crank angle (absolute crank angle) of the engine 10 on a basis of the compression top dead center of a predetermined cylinder, based on a signal from this crank angle sensor 74 and a cam position sensor which is not shown. Furthermore, the ECU 80 acquires an engine rotational speed NE, based on a signal from the crank angle sensor 74.

A fuel pressure sensor 75: This measures the pressure of fuel supplied to the fuel injection valve 39 (fuel pressure PF), and outputs a signal representing this fuel pressure PF.

An accelerator operation quantity sensor 76: This detects the operation quantity Accp of an accelerator pedal 91, and outputs a signal representing this operation quantity Accp.

A brake switch 77: This detects an operation of a brake pedal 92 and outputs a signal representing that the brake pedal 92 is operated.

A vehicle speed sensor 78: This measures a speed of a vehicle (vehicle speed SPD) on which the engine 10 is mounted, and outputs a signal representing this vehicle speed SPD.

An ignition switch 79: This is a switch operated by a driver in order to operate the engine 10 or stop the operation of the engine 10, and sends out a signal representing its ON-OFF state to the ECU 80.

Furthermore, the ECU 80 sends out an instruction (drive) signal to various actuators (the throttle valve actuator 45a, the ignition device 35 and the fuel injection valve 39, etc.).

(Outline of Operation of Present Unit)

<Automatic Stop and Automatic Restart Control>

The present unit performs an automatic stop control in which an injection of fuel from the fuel injection valve 39 is stopped and the rotation of the engine 10 is stopped, when a predetermined automatic stop condition is satisfied. At this time, the present unit stops electrification to the primary side coil 37a of the ignition coil 37 (and interception thereof). Therefore, ignition is also stopped.

The automatic stop condition in this example is satisfied when all the following conditions are satisfied.

(1) The brake pedal 92 is stepped in (operated).

(2) The accelerator pedal 91 is not stepped in (not operated).

(3) The vehicle speed SPD is not more than a predetermined speed SPDth.

When a restart demand occurs after the automatic stop control was started, the present unit starts (restarts) the engine 10 by performing any of the following controls according to the engine rotational speed NE at that time. In addition, in this example, the restart demand is generated when the accelerator pedal 91 begins to be stepped in after an initiation of the automatic stop control.

(1) When the engine rotational speed NE at the time of a restart demand occurring is higher than a first threshold value speed NE1 (NE>NE1), the present unit performs a usual control (usual operation start-up control) and restarts the engine 10. The usual control is a "control during a usual operation" in which fuel injection is performed in the latter half of a compression stroke and ignition is performed near the compression top dead center. Therefore, the starter electromotor 26 is not driven by the usual control.

(2) When the engine rotational speed NE at the time of a restart demand occurring is not higher than the first threshold value speed NE1 and higher than a second threshold value speed NE2 (NE2<NE≤NE1), the present unit performs an ignition start-up control and restarts the engine 10. The ignition start-up control is a control in which a fuel injection is performed in the first half of an expansion stroke, in a "cylinder in the first half of the expansion stroke (for instance, a cylinder whose crank angle is between 10 [deg.] and 30 [deg.] after the compression top dead center)" or a "cylinder which faces the first half of the expansion stroke for the first time after an occurrence of a restart demand" at the time of the occurrence of the restart demand and an ignition is performed at the time immediately after the fuel injection. Hereafter, the "cylinder in the first half of the expansion stroke" or the "cylinder which faces the first half of the expansion stroke for the first time after an occurrence of a restart demand" at the time of the occurrence of the restart demand may be referred to as an "expansion stroke cylinder." Furthermore, a cylinder which is in a compression stroke in a period during which the expansion stroke cylinder is in an expansion stroke may be referred to as a "compression stroke cylinder." In addition, the starter electromotor 26 is not driven by the ignition start-up control.

(3) When the engine rotational speed NE at the time of a restart demand occurring is not more than the second threshold value speed NEs (NE≤NE2), the present unit waits for the engine rotational speed NE to fall to a third threshold value speed NE3 (NE<NE3<NE2), performs a starter start-up control, and restarts the engine 10. The starter start-up control is a control in which a fuel injection is performed in the latter half of a compression stroke and an ignition is performed near the compression top dead center while the engine 10 is being cranked by the operation of the starter 26.

<Re-Injection in Ignition Start-Up Control>

One of features of the present unit is in that fuel is re-injected in a compression stroke cylinder when a start-up failure occurs in the above-mentioned ignition start-up control. Hereafter, this feature will be explained, referring to FIG. 3(A) and FIG. 3(B). In addition, although the engine 10 is a four-cylinder engine, in FIG. 3(A) and FIG. 3(B), attention is paid to a first cylinder and a third cylinder whose firing orders are adjacent.

Figure 3A:
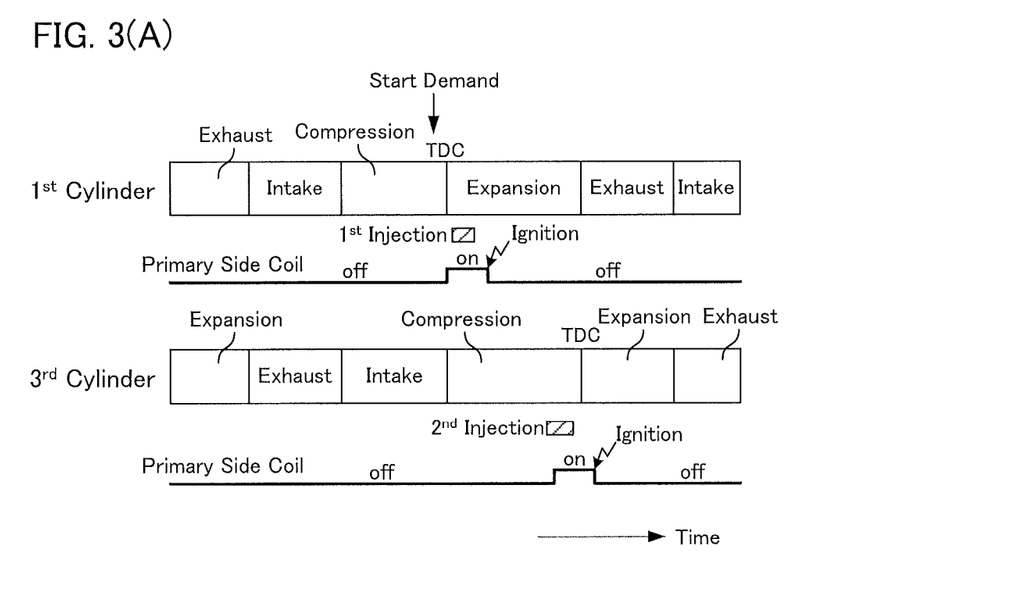
FIG. 3(A) and FIG. 3(B) are diagrams for explaining an operation of an electronic control unit shown in FIG. 1 in an ignition start-up control.

FIG. 3(A) shows an example of a case where the ignition start-up control is performed based on a restart demand occurred when the automatic stop control is being performed and as a result the engine is successfully restarted without a start-up failure occurring.

In this example, the first cylinder is the cylinder which faces the first half of an expansion stroke for the first time after the time of a restart demand occurring (namely, the expansion stroke cylinder). Then, the present unit injects fuel to the first cylinder in the first half of the expansion stroke of the first cylinder, and thereafter ignites the fuel. This fuel injection is referred to as a first injection, for convenience.

Furthermore, in order to sufficiently obtain a start-up torque (torque required for attaining a restart of the engine 10), the present unit injects fuel to the third cylinder (compression stroke cylinder) that is in a compression stroke at that time, in the latter half of the compression stroke, and ignites the fuel when the crank angle of the third cylinder is near the compression top dead center after the compression top dead center. This fuel injection is referred to as a second injection, for convenience. Thereby, the engine rotational speed NE goes on rising. In addition, also in a fourth cylinder and a second cylinder, etc. that face a compression stroke after the third cylinder, a fuel injection in the latter half of the compression stroke and an ignition near the compression top dead center are performed, although they are not shown.

Figure 3B:
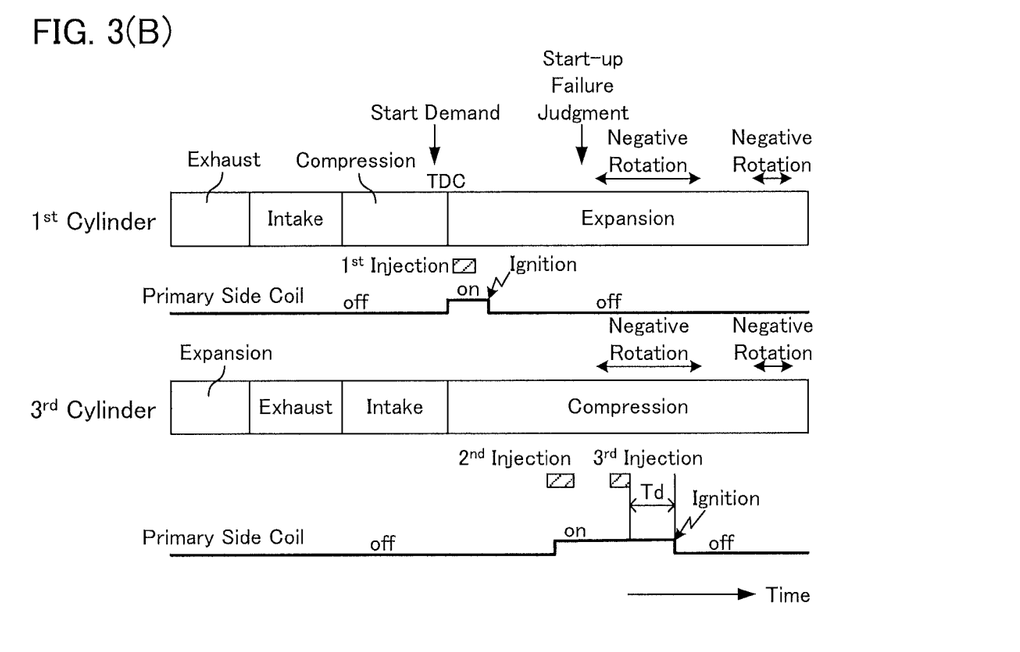

FIG. 3(B) shows an example of a case where the ignition start-up control is performed based on a restart demand occurred when the automatic stop control is being performed like FIG. 3(A), but the third cylinder cannot get over the compression top dead center and as a result a start-up failure occurs.

Also in this example, similarly to the example shown in FIG. 3(A), the second injection to the third cylinder and the initiation of the electrification to (turning on) the primary side coil 37a of the ignition coil 37 of the third cylinder are performed. However, in this example, a start-up failure has occurred after the second injection. Therefore, the engine 10 stops its rotation gradually, repeating a negative rotation and a positive rotation. In addition, this repetition of a negative rotation and a positive rotation of the engine 10 may be referred to as an "aftershock."

By the way, at the "time when it is judged that a start-up failure has occurred", the second injection has already been performed. Therefore, the fuel injected by the second injection remains in the third cylinder (compression stroke cylinder), and fuel-air mixture is formed with the fuel. This fuel-air mixture receives heat from the wall surface of the third cylinder to be an elevated temperature, and further goes on being compressed by the positive rotation after the engine 10 does a negative rotation. As a result, when not taking any measures, there is a possibility that self-ignition of the fuel-air mixture may occur and thereby the negative rotation may be promoted.

Then, the present unit performs further fuel injection (re-injection) to the compression stroke cylinder, when the second injection has been already performed to the compression stroke cylinder at the "time when it is judged that a start-up failure has occurred." This further fuel injection is referred to as a "third injection", for convenience.

With the fuel injected by this third injection, the fuel-air mixture formed in the compression stroke cylinder (in this case, the third cylinder) becomes excessively thick (becomes over-rich). From these things, even when the fuel-air mixture in the compression stroke cylinder is compressed at the time of a positive rotation after a negative rotation of the engine 10, a self-ignition of the fuel-air mixture is suppressed. Therefore, since the promotion of a further negative rotation is suppressed, an aftershock is prevented from continuing for a long time. As a result, the starter start-up control can be started at an early stage, and the engine 10 can be restarted at an early stage.

In addition, in a case where the electrification to the primary side coil 37a of the compression stroke cylinder (in this case, the third cylinder) has been started (turned on) at the "time when it is judged that a start-up failure has occurred", the present unit intercepts (shuts off) the electrification to this primary side coil 37a when a predetermined time Td has passed since the end time of the third injection (or the start time of the third injection). As a result, although a spark occurs, since the fuel-air mixture formed in the compression stroke cylinder (in this case, the third cylinder) has become excessively thick (over-rich), the fuel-air mixture cannot be ignited easily. Therefore, since it is suppressed that a further negative rotation is promoted, it is suppressed that an aftershock continues for a long time. As a result, the starter start-up control can be started at an early stage, and the engine 10 can be restarted at an early stage. Furthermore, since it is avoided that electrification to the primary side coil 37a lasts for a long time, the "Fuse" (fuse) and/or the "igniter (ignition circuit) 38 including the power transistor 38a" shown in FIG. 2 can be protected.

<Decrease of Fuel after Re-Injection in Ignition Start-Up Control>

By the way, when the above-mentioned third injection is performed, excessively thick (over-rich) fuel-air mixture is discharged to an exhaust passage. Generally, since a large quantity of air (gas containing oxygen) flows into the catalyst 53 during the automatic stop control before the ignition start-up control is started, the catalyst 53 is in an oxygen excess status. Therefore, the unburned component contained in the excessively thick mixture formed by the third injection is purified by the catalyst 53.

However, for an occasion where the catalyst 53 cannot purify the unburned component in some cases, the present unit decreases the quantity of the fuel injection for a predetermined period as compared with that in usual time, after the completion of the start-up by the starter start-up control after performing the third injection. Thereby, since the atmosphere in the catalyst 53 does not become over-rich (lack of oxygen), the unburned component contained in the excessively thick fuel-air mixture formed by the third injection can be purified certainly. The above is an outline of the present unit.

(Specific Operation)

Next, a specific operation of the present unit will be explained. The CPU of the ECU 80 of the present unit (hereafter, will be simply referred to as a "CPU") is configured to perform a routine shown as a flowchart in FIG. 4 whenever a predetermined time has passed. An automatic stop control is started by this routine.

Figure 4:
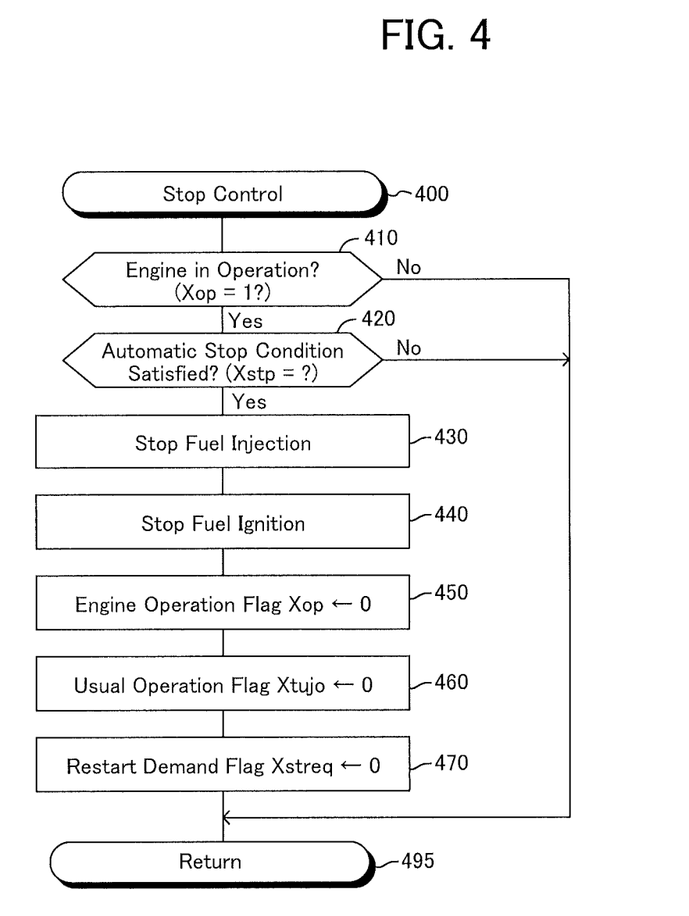
FIG. 4 is a flowchart for showing a routine which a CPU shown in FIG. 1 performs.

When it becomes a predetermined timing, the CPU starts processing from step 400, progresses to step 410, and judges whether the engine 10 is currently in operation. Namely, the CPU judges whether a value of an engine operation flag Xop is "1." The engine operation flag Xop represents that the engine 10 is in operation (being after startup and before the initiation of the automatic stop control) when its value is "1." The engine operation flag Xop represents that the engine 10 is being stopped automatically (being after the initiation of the automatic stop control and before the completion of restart) when its value is "0." When the value of the engine operation flag Xop is "0", the CPU judges at step 410 as "No", progresses to step 495, and once ends this routine.

When the value of the engine operation flag Xop is "1", the CPU judges at step 410 as "Yes", progresses to step 420, and judges whether the above-mentioned automatic stop condition is satisfied. More specifically, The CPU judges whether a value of a stop condition satisfaction flag Xstp is "1." By a routine (not shown) performed by the CPU, the value of the stop condition satisfaction flag Xstp is set to "1" when the above-mentioned automatic stop condition is satisfied, and it is set to "0" when the above-mentioned restart demand occurs. When the value of the stop condition satisfaction flag Xstp is "0", the CPU judges at step 420 as "No", progresses to step 495, and once ends this routine. Therefore, in this case, the automatic stop control which will be mentioned is not performed.

On the other hand, when the value of the stop condition satisfaction flag Xstp is "1", the CPU judges at step 420 as "Yes", performs the following processing of step 430 to step 470 in order, progresses to step 495, and once ends this routine. Thereby, the automatic stop control is performed.

Step 430: The CPU stops fuel injection by stopping sending out of an instruction signal to the fuel injection valve 39.

Step 440: By stopping sending out of the instruction signal to the ignition device 35 (igniter 38), the CPU maintains the primary side coil 37a of each cylinder in a non-electrification status, and stops an ignition.

Step 450: The CPU sets the value of the engine operation flag Xop to "0."

Step 460: The CPU sets a value of a usual operation flag Xtujo to "0." The value of the usual operation flag Xtujo is set to "1" when the usual operation control is being performed, as will be mentioned later.

Step 470: The CPU sets a value of a restart demand flag Xstreq to "0." By a routine (not shown) performed by the CPU, the value of the restart demand flag Xstreq is set to "1" when it is judged that the above-mentioned restart demand has occurred.

Figure 5:
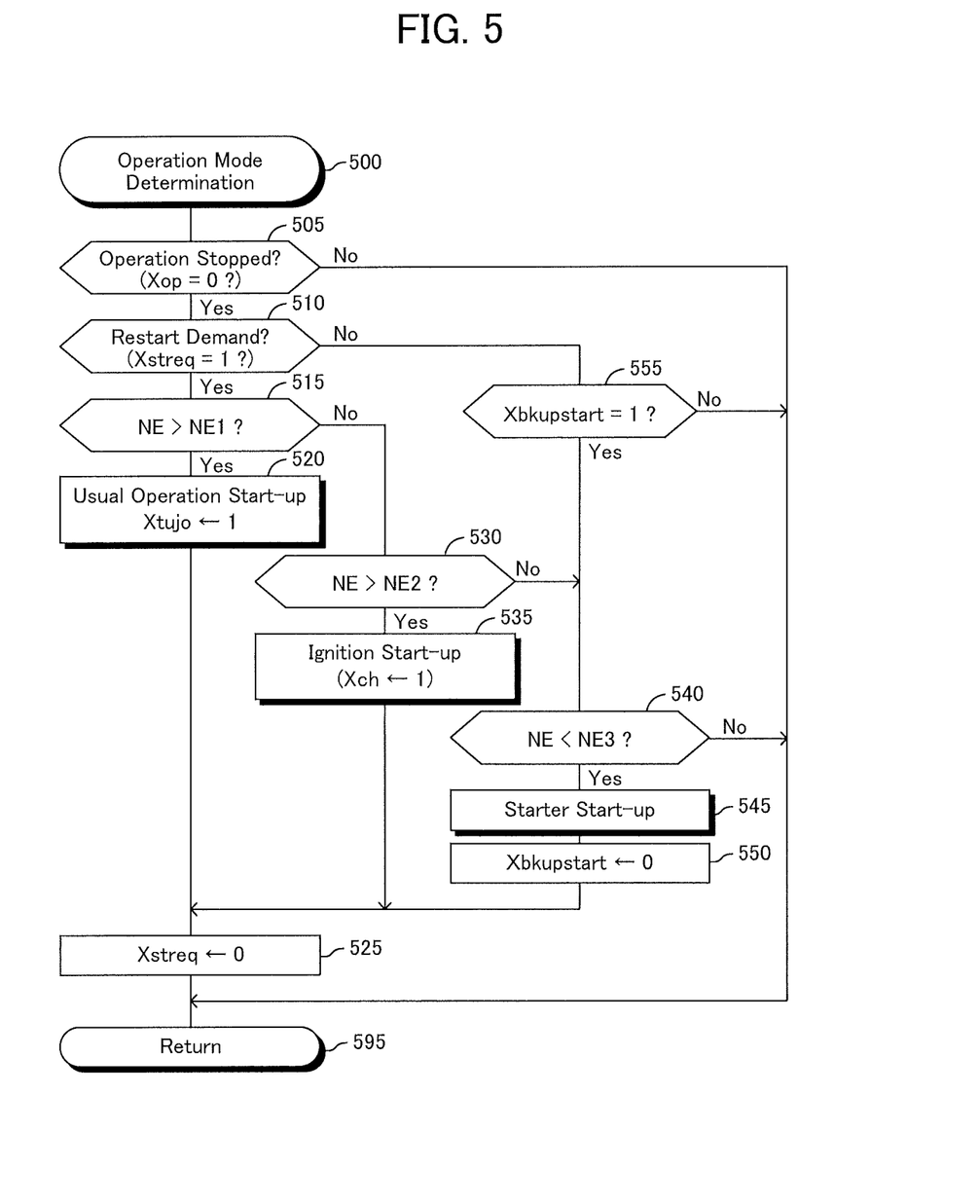
FIG. 5 is a flowchart for showing a routine which a CPU shown in FIG. 1 performs.

Furthermore, the CPU is configured to perform a routine shown as a flowchart in FIG. 5, whenever a predetermined time has passed. By this routine, it is determined which control is to be performed in order to restart the engine 10.

When it becomes a predetermined timing, the CPU starts processing from step 500, progresses to step 505, and judges whether the operation of the engine 10 is being stopped (the automatic stop control is in execution) currently. Namely, the CPU judges whether the value of the engine operation flag Xop is "0." When the value of the engine operation flag Xop is "1", the CPU judges at step 505 as "No", progresses to step 595, and once ends this routine.

On the other hand, when the value of the engine operation flag Xop is "0" (when the automatic stop control is being performed), the CPU judges at step 505 as "Yes", progressed to step 510, and judges whether a restart demand has generated. More concretely, the CPU judges whether the value of the restart demand flag Xstreq is "1."

Assuming that the restart demand has occurred and the value of the restart demand flag Xstreq is set to "1" currently. In this case, the CPU judges at step 510 as "Yes", progresses to step 515, and judges whether the engine rotational speed NE is larger than the first threshold value speed NE1.

When the engine rotational speed NE is larger than first threshold value speed NE1, the CPU judges at step 515 as "Yes", progresses to step 520, and sets the value of the usual operation flag Xtujo to "1" so that the start-up by the above-mentioned usual control (usual operation start-up control) is performed. The usual control will be explained later in detail, referring to FIG. 8. Thereafter, the CPU progresses to step 525, sets the value of the restart demand flag Xstreq to "0", progresses to step 595, and once ends this routine. As a result, when the engine rotational speed NE at the time of occurrence of the restart demand is larger than the first threshold value speed NE1, the engine 10 is restarted by the usual control.

On the other hand, when the engine rotational speed NE at the time of the restart demand occurring is not more than the first threshold value speed NE1, the CPU judges at step 515 as "No", progresses to step 530, and judges whether the engine rotational speed NE is larger than the second threshold value speed NE2. The second threshold value speed NE2 is larger than 0 (zero) and smaller than the first threshold value speed NE1.

When the engine rotational speed NE is larger than the second threshold value speed NE2, the CPU judges at step 530 as "Yes", progresses to step 535, and sets a value of an ignition start-up control flag Xch to "1" so that the above-mentioned ignition start-up control is performed. The ignition start-up control will be explained later in detail, referring to FIG. 6. Thereafter, the CPU goes through step 525 and once ends this routine. As a result, when the engine rotational speed NE at the time of the restart demand occurring is not more than the first threshold value speed NE1 and larger than the second threshold value speed NE2, the engine 10 is restarted by the ignition start-up control.

On the other hand, when the engine rotational speed NE at the time of the restart demand occurring is not more than the second threshold value speed NE2, the CPU judges at step 530 as "No", progresses to step 540, and judges whether the engine rotational speed NE is smaller than the third threshold value speed NE3. The third threshold value speed NE3 is larger than 0 (zero) and smaller than the second threshold value speed NE2.

When the engine rotational speed NE is not less than the third threshold value speed NE3, the CPU judges at step 540 as "No", directly progresses to step 595, and once ends this routine. As a result, when this routine will be performed next time, the CPU will progress to step 505 to step 515, step 530 and step 540. As a result, the CPU will wait until the engine rotational speed NE will become less than the third threshold value speed NE3.

Then, when the engine rotational speed NE becomes less than the third threshold value speed NE3, the CPU judges at step 540 as "Yes", progresses to step 545, and performs the above-mentioned starter start-up control. Thereafter, the CPU progresses to step 550, sets a value of a backup restart flag Xbkupstart to "0", goes through step 525, and once ends this routine. As a result, when the engine rotational speed NE becomes less than the third threshold value speed NE3, the engine 10 is restarted by the starter start-up control.

By the way, when the value of the restart demand flag Xstreq is "0" (the restart demand has not occurred) at the time that the CPU performs processing of step 510, the CPU judges at the step 510 as "No", progresses to step 555, and judges whether the value of the backup restart flag Xbkupstart is "1." When the value of this flag Xbkupstart is "0", the CPU judges at step 555 as "No", and once ends this routine. On the other hand, when the value of the flag Xbkupstart is "1", the CPU judges at step 555 as "Yes", and it progresses to step 540. As a result, when the engine rotational speed NE becomes less than the third threshold value speed NE3, the engine 10 is restarted by the starter start-up control. This flow from step 555 to step 540 and step 545 will be mentioned later.

Next, the precise of the above-mentioned ignition start-up control will be explained. The CPU is configured to perform a routine shown as a flowchart in FIG. 6, whenever a predetermined time has passed. Therefore, when it becomes a predetermined timing, the CPU starts processing from step 600 in FIG. 6, progresses to step 602, and judges whether the value of the ignition start-up control flag Xch is "1." When the value of the ignition start-up control flag Xch is not "1", the CPU judges at step 602 as "No", progresses to step 695, and once ends this routine.

Figure 6:
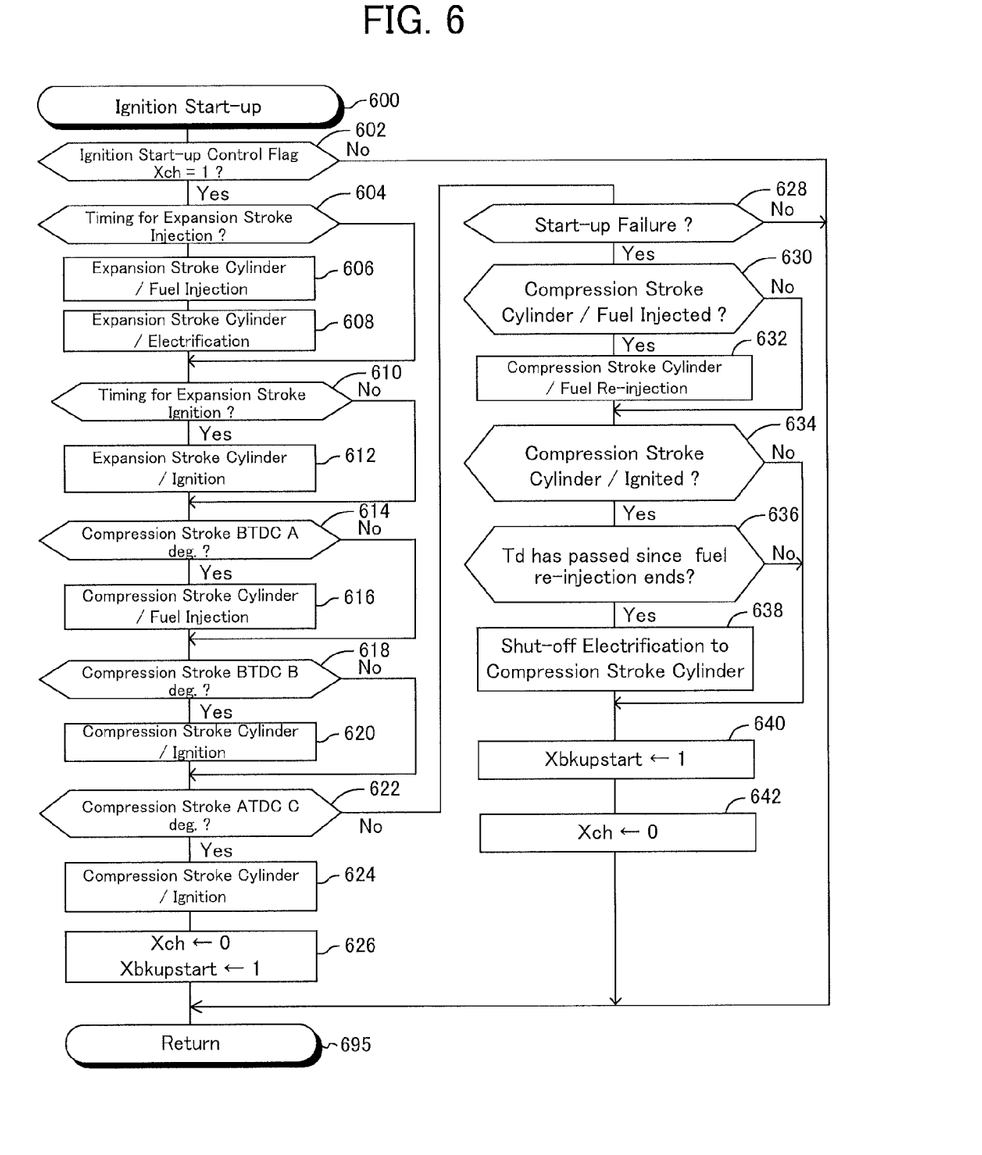
FIG. 6 is a flowchart for showing a routine which a CPU shown in FIG. 1 performs.

On the other hand, when the value of the ignition start-up control flag Xch is "1", the CPU judges at step 602 as "Yes", progresses to step 604, and judges whether the present time is in the first half of the expansion stroke in the expansion stroke cylinder (in this example, at a crank angle between 10 [deg.] and 30 [deg.] after the compression top dead center), that is, whether it is currently a timing for fuel injection in the expansion stroke cylinder.

When the present time is the timing for fuel injection in the expansion stroke cylinder, the CPU judges at step 604 as "Yes", and injects fuel in a first predetermined quantity at least once or more from the fuel injection valve 39 of the expansion stroke cylinder at step 606. Thereby, the first injection shown in FIG. 3(A) and FIG. 3(B) is performed. Subsequently, the CPU electrifies the primary side coil 37a of the ignition coil 37 of the expansion stroke cylinder in step 608. Thereafter, the CPU progresses to step 610. On the other hand, when the present time is not the timing for fuel injection in the expansion stroke cylinder, the CPU judges at step 604 as "No", and progresses to step 610 directly.

The CPU judges whether the present time is timing for ignition in the expansion stroke cylinder (in this example, at a crank angle between 40° and 45° after the compression top dead center) at step 610.

When the present time is the timing for ignition in the expansion stroke cylinder, the CPU judges at step 610 as "Yes", and intercepts electrification to the primary side coil 37a of the expansion stroke cylinder at step 612. As a result, a spark for ignition occurs from the electrode part of the spark plug 36 of the expansion stroke cylinder, and the fuel-air mixture formed with the fuel injected by the first injection is ignited burned by the spark. Thereafter, the CPU progresses to step 614. On the other hand, when the present time is not the timing for ignition in the expansion stroke cylinder, the CPU judges at step 610 as "No", and progresses to step 614 directly.

The CPU judges whether a crank angle at present is A [deg.] before the compression top dead center of the compression stroke cylinder (for instance, a crank angle before the compression top dead center (BTDC) 10 [deg.]) at step 614.

When the crank angle at present is A [deg.] before the compression top dead center of the compression stroke cylinder, the CPU judges at step 614 as "Yes", and injects fuel in a second predetermined quantity from the fuel injection valve 39 of the compression stroke cylinder at step 616. Thereby, the second injection shown in FIG. 3(A) and FIG. 3(B) is performed. Thereafter, the CPU progresses to step 618. On the other hand, when the crank angle at present is not A [deg.] before the compression top dead center of the compression stroke cylinder, the CPU judges at step 614 as "No", and progresses to step 618 directly.

The CPU judges whether a crank angle at present is B [deg.] before the compression top dead center of the compression stroke cylinder (for instance, BTDC 5 [deg.]) at step 618.

When the crank angle at present is B [deg.] before the compression top dead center of the compression stroke cylinder, the CPU judges at step 618 as "Yes", and starts electrification to the primary side coil 37a of the compression stroke cylinder at step 620. Thereafter, the CPU progresses to step 622. On the other hand, when the crank angle at present is not B [deg.] before the compression top dead center of the compression stroke cylinder, the CPU judges at step 618 as "No", and progresses to step 622 directly.

The CPU judges whether a crank angle at present is C [deg.] after the compression top dead center of the compression stroke cylinder (for instance, ATDC 5 [deg.]) at step 622.

By the way, when the ignition start-up goes smoothly by burning of fuel by the first injection, the compression stroke cylinder gets over the compression top dead center, and the engine 10 positively rotates. Therefore, at a predetermined timing, the crank angle of the compression stroke cylinder reaches C [deg.] after the compression top dead center. In this case, the CPU judges at step 622 as "Yes", progresses to step 624, and intercepts electrification to the primary side coil 37a of the compression stroke cylinder. As a result, a spark for ignition occurs from the electrode part of the spark plug 36 of the compression stroke cylinder, and the fuel-air mixture formed with the fuel injected by the second injection is ignited and burned by the spark. Thereafter, the CPU progresses to step 626, sets the value of the ignition start-up control flag Xch to "0" and sets the value of the backup restart flag Xbkupstart to "1", progresses to step 695, and once ends this routine. Thereby, the engine 10 is restarted by the ignition start-up control.

On the other hand, when the ignition start-up does not go smoothly and the compression stroke cylinder cannot get over the compression top dead center even though the fuel by the first injection is burned, a start-up failure may occur. The CPU is performing judgment on this start-up failure at a short time interval. More concretely, the CPU monitors whether any of the following statuses generates after the execution of the first injection, and judges that a start-up failure has occurred when it is detected that any of the statuses has occurred.

(Status 1) A status in which the engine rotational speed NE changes from a positive value to a negative value. Namely, it is a status in which the rotation of the engine 10 is reversed from the positive direction of rotation to the negative direction of rotation.

(Status 2) A status in which a status that the engine rotational speed NE is "0" has continued for predetermined time.

(Status 3) A status in which a status that the engine rotational speed NE changes from a positive value to a negative value is predicted from a variation per unit time of the engine rotational speed NE.

Since such a start-up failure is produced when the compression stroke cylinder cannot get over the top dead center, a judgment that a start-up failure has occurred is performed at "the time before the crank angle of the compression stroke cylinder reaches C [deg.] after the compression top dead center of the compression stroke cylinder."

Namely, when the CPU processes the processing of step 622 at the time before the crank angle of the compression stroke cylinder reaches C [deg.] after the compression top dead center, the CPU judges at the step 622 as "No", progresses to step 628, and judges whether a judgment that a start-up failure generates or is predicted to generate has been made. When such a judgment has not been made at this time, the CPU judges at step 628 as "No", progresses to step 695 directly, and once ends this routine.

On the other hand, when the judgment that a start-up failure generates or is predicted to generate has been made, the CPU judges at step 628 as "Yes", progresses to step 630, and judges whether the fuel injection to the compression stroke cylinder (namely, the second injection in accordance with the processing of step 616) has been already executed. When the second injection has not been already executed at this time, the CPU judges at step 630 as "No", and progresses to step 634 directly.

On the other hand, when the second injection has been already executed at the time of the CPU performing the processing of step 630, the CPU judges at the step 630 as "Yes", progresses to step 632, and injects (re-injects) a third predetermined quantity of fuel from the fuel injection valve 39 of the compression stroke cylinder to the compression stroke cylinder. Namely, the CPU performs the third injection shown in FIG. 3(B). As a result of this, the fuel-air mixture in the compression stroke cylinder is cooled by vaporization latent heat of the fuel injected by the third injection, it becomes an excessively thick mixture with the fuel. Therefore, even when the direction of rotation of the engine 10 changes to a positive rotation and the fuel-air mixture in the compression stroke cylinder is compressed after this time, a self-ignition of the fuel-air mixture is suppressed. Therefore, the negative rotation of the engine 10 and the promotion of the aftershock are suppressed. Then, the CPU progresses to step 634.

The CPU judges whether the electrification to the primary side coil 37a of the compression stroke cylinder has been already started at step 634. Namely, it judges whether the processing of step 620 has been performed before present time. When the electrification to the primary side coil 37a of the compression stroke cylinder has not been already started, the CPU judges at step 634 as "No", and it progresses to step 640 directly.

On the other hand, when the electrification to the primary side coil 37*a* of the compression stroke cylinder has been already started, the CPU judges at step 634 as "Yes", progresses to step 636, and judges whether a predetermined time Td has passed since the end time of the re-injection (the third injection) of fuel by the processing of step 632. This predetermined time Td is set to time required for sufficiently evaporating the fuel injected by the third injection and sufficiently mixing it with the fuel-air mixture formed with the fuel injected by the second injection. When the predetermined time Td has not yet passed since the end time of the third injection, the CPU judges at step 636 as "No", and progresses to step 640 directly. In addition, the CPU may judge whether a predetermined time (Td+α) has passed since the initiation time of the third injection in step 636. Namely, the CPU judges whether a predetermined time has passed since the time of performing the third injection (the initiation time of the third injection or the end time of the third injection) in step 636.

On the other hand, when the predetermined time Td has passed since the end time of the third injection, the CPU judges at step 636 as "Yes", progresses to step 638, and intercepts electrification to the primary side coil 37*a* of the compression stroke cylinder. As a result, although a spark for ignition occurs in the compression stroke cylinder, the fuel-air mixture is not ignited and burned easily since the fuel-air mixture is excessively thick. Therefore, a negative rotation of the engine 10 and an aftershock are hard to be promoted. Thereafter, the CPU progresses to step 640.

The CPU sets the value of the backup restart flag Xbkupstart to "1" at step 640, and sets the value of the ignition start-up control flag Xch to "0" at step 642. Thereafter, the CPU progresses to step 695 and once ends this routine. The above is a precise of the ignition start-up control.

By the way, when the CPU progresses to step 555 of FIG. 5 after the value of the backup restart flag Xbkupstart is set to "1" in step 626 or step 640, the CPU judges at the step 555 as "Yes", and progresses to step 540. Therefore, even in a case where the restart of the engine 10 does not succeed by the ignition start-up control, when the engine rotational speed NE becomes less than the third threshold value speed NE3, the starter start-up control will be performed and, as a result, the engine 10 will be restarted.

Figure 7:
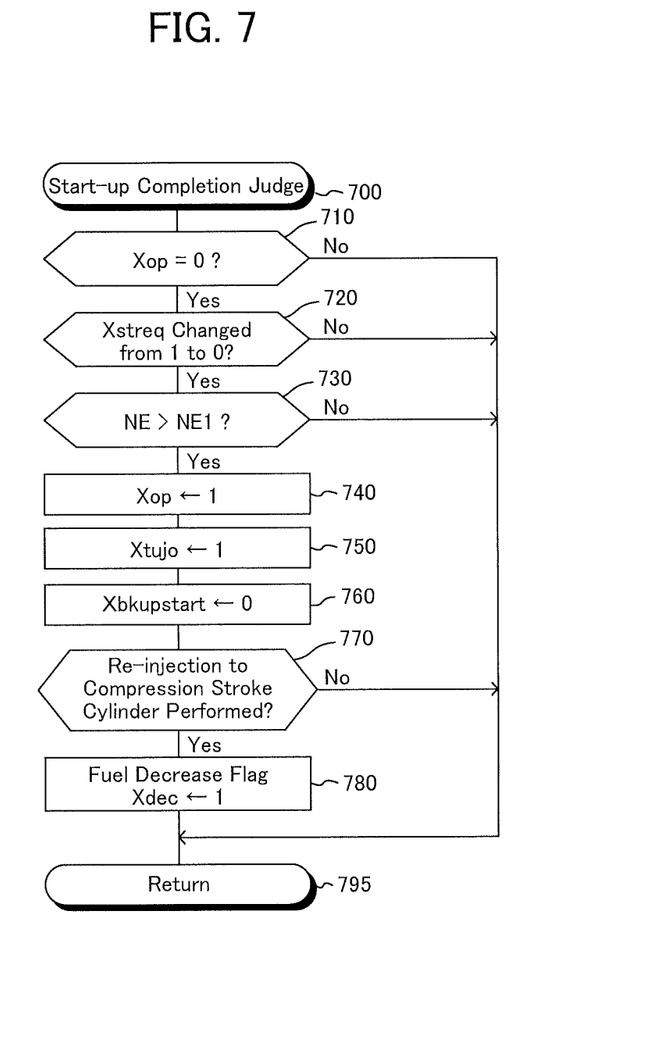
FIG. 7 is a flowchart for showing a routine which a CPU shown in FIG. 1 performs.

Furthermore, the CPU is configured to perform the "start-up completion judging routine" shown as a flowchart in FIG. 7, whenever a predetermined time has passed. Therefore, when it becomes a predetermined timing, the CPU starts processing from step 700 in FIG. 7, progresses to step 710, and judges whether the value of the engine operation flag Xop is "0." When the value of the engine operation flag Xop is not "0" (namely, the engine 10 is in operation), the CPU judges at step 710 as "No", and once ends this routine.

On the other hand, when the value of the engine operation flag Xop is "0" (namely, the engine 10 is after the initiation of the automatic stop control and before the completion of restart), the CPU judges at step 710 as "Yes", progresses to step 720, and judges whether the value of the restart demand flag Xstreq has been set from "1" to "0." As will be understood from step 510 and step 525 in FIG. 5, when some start-up control (refer to step 520, step 535 and the step 545) is performed after a restart demand occurs and the value of the restart demand flag Xstreq is set to "1", the value of the restart demand flag Xstreq is returned to "0." Therefore, step 720 is a step for judging whether some start-up control has been performed.

When any start-up control is not performed after a restart demand occurs, the CPU judges at step 720 as "No", and once ends this routine. On the other hand, when some start-up control is performed after a restart demand occurs, the CPU judges at step 720 as "Yes", progresses to step 730, and judges whether the engine rotational speed NE is larger than a start-up judging rotational speed (in this example, the first threshold value speed NE1). When the engine rotational speed NE is not more than the start-up judging rotational speed NE1, the CPU judges at step 730 as "No", and once ends this routine.

On the other hand, when the engine rotational speed NE is larger than the start-up judging rotational speed NE1, the CPU judges at step 730 as "Yes", performs the following processing of step 740 to step 760 in order, and progresses to step 770.

Step 740: The CPU sets the value of the engine operation flag Xop to "1." Namely, the CPU judges that the restart of the engine 10 has been completed and the engine 10 has shifted to a usual operation status.

Step 750: The CPU sets the value of the usual operation flag Xtujo to "1." As a result of this, the usual control according to the routine in FIG. 8 which will be mentioned later is performed (refer to the judgment as "Yes" in step 805 of FIG. 8).

Step 760: The CPU sets the value of the backup restart flag Xbkupstart to "0."

Next, the CPU progresses to step 770, and then judges whether there is a history that the re-injection of fuel to the compression stroke cylinder (namely, the third injection) has been made in the last start-up control (more specifically, the ignition start-up control). When the third injection has not been made at this time, the CPU judges at step 770 as "No", and once ends this routine.

On the other hand, when (there is a history that) the third injection has been made, the CPU judges at step 770 as "Yes", progresses to step 780, and sets a value of a fuel decrease flag Xdec to "1." As a result, the quantity of fuel injection is decreased by a routine in FIG. 8 which will be mentioned later (refer to step 815 to step 825 in FIG. 8). Thereafter, the CPU progresses to step 795 and once ends this routine.

Figure 8:
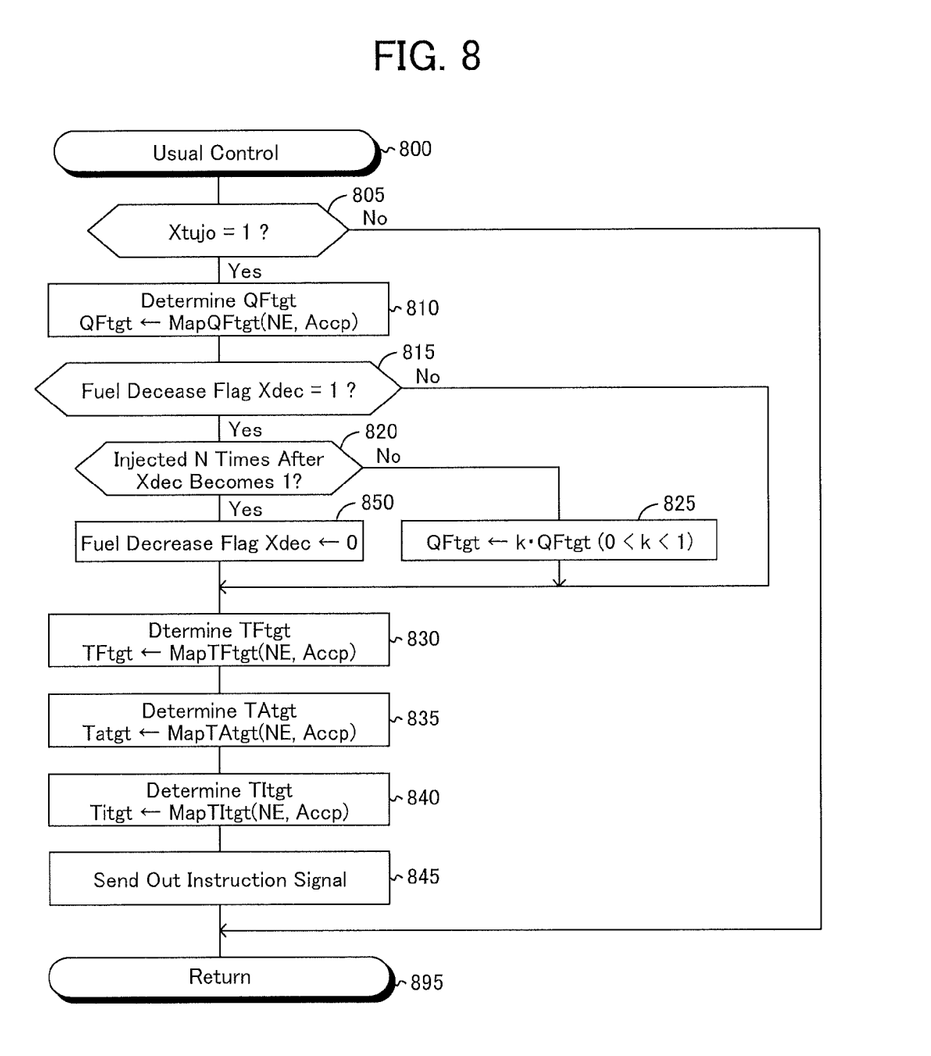
FIG. 8 is a flowchart for showing a routine which a CPU shown in FIG. 1 performs.

Furthermore, the CPU is configured to perform a "usual control routine" shown as a flowchart in FIG. 8, whenever a predetermined time has passed. Therefore, when it becomes a predetermined timing, the CPU starts processing from step 800 in FIG. 8, progress to step 805, and judges whether the value of the usual operation flag Xtujo is "1." When the value of the usual operation flag Xtujo is not "1", the CPU judges at step 805 as "No", and once ends this routine.

On the other hand, when the value of the usual operation flag Xtujo is "1", the CPU judges at step 805 as "Yes", progresses to step 810, and acquires a target injection quantity QFtgt by applying "an accelerator pedal operation quantity Accp as a substitute value of the engine rotational speed NE and an engine load" to a look-up table MapQFtgt (NE, Accp).

Next, the CPU progresses to step 815 and judges whether the value of the fuel decrease flag Xdec is "1." When the value of the fuel decrease flag Xdec is not "1", the CPU judges at step 815 as "No", and progresses directly to step 830 and later.

On the other hand, when the value of the fuel decrease flag Xdec is "1", the CPU judges at step 815 as "Yes", progresses to step 820, and judges whether a fuel injection has been performed predetermined times (N times) by processing in step 845 which will be mentioned later, after the value of the fuel decrease flag Xdec changed from "0" to "1."

When the fuel injection has not been carried out N times, the CPU judges at step 820 as "No", progresses to step 825, and sets a value obtained by multiplying the target injection quantity QFtgt acquired at step 810 by the coefficient (decrease coefficient) k as a new target injection quantity QFtgt. The coefficient k is a constant larger than 0 (zero) and smaller than 1. Thereby, the target injection quantity QFtgt when the value of the fuel decrease flag Xdec is "1" becomes smaller than the target injection quantity QFtgt when the value of the fuel decrease flag Xdec is "0." Namely, the quantity of fuel injection is decreased. Thereafter, the CPU progresses to step 830 and later.

On the other hand, when fuel injection has been performed N times after the value of the fuel decrease flag Xdec changed from "0" to "1", the CPU judges at step 820 as "Yes", progresses to step 850, and sets the value of the fuel decrease flag Xdec as "0." Thereafter, the CPU progresses to step 830 and later. As a result, a decrease of fuel injection is completed.

When the CPU progresses to step 830, it will acquire a target injection timing TFtgt by applying the engine rotational speed NE and the accelerator operation quantity Accp to a look-up table MapTFtgt (NE, Accp). Furthermore, the CPU performs the following processing of step 835 to step 845 in order, progresses to step 895, and once ends this routine.

Step 835: The CPU acquires a target ignition timing TItgt by applying the engine rotational speed NE and the accelerator operation quantity Accp to a look-up table MapTFtgt (NE, Accp).

Step 840: The CPU acquires a target throttle valve opening TAtgt by applying the engine rotational speed NE and the accelerator operation quantity Accp to a look-up table MapTAtgt (NE, Accp).

Step 845: The CPU sends out instruction signals to the fuel injection valve 39, the ignition device 35 and the throttle valve actuator 45*a* in accordance with the target injection quantity QFtgt, the target injection timing TFtgt, the target ignition timing TItgt and the target throttle valve opening TAtgt, respectively. The usual control is performed by the above.

As explained above, in accordance with the present unit, since a re-injection (the third injection) of fuel is performed even in a case where a start-up failure occurs in the ignition start-up control, an occurrence of burning by a self-ignition or an ignition which promotes a negative rotation in the compression stroke cylinder is suppressed. Therefore, since an aftershock does not continue for a long time even when the ignition start-up is not successfully performed, the starter start-up can be started at an early stage. Furthermore, when a start-up failure occurs in the ignition start-up control, the electrification time to the primary coil 37*a* of the compression stroke cylinder does not last for a long time. Therefore, the ignition circuit including the igniter 35 can be protected.

The present invention is not limited to the above-mentioned embodiments, and can adopt various modifications within the scope of the present invention. For instance, although the quantity of fuel injection is performed in the above-mentioned embodiment when the third injection has been performed (refer to step 825), it is not essential to decrease the quantity of fuel like this.

Furthermore, although the ignition start-up control is performed when the engine rotational speed NE is going to "0" while the engine 10 is rotating positively in the above-mentioned embodiment, the ignition start-up control may be performed when the engine 10 negatively rotates and the crank angle of the expansion stroke cylinder approaches the compression top dead center.

REFERENCE SIGNS LIST

10: Internal Combustion Engine, 32: Intake Valve, 34: Exhaust Valve, 35: Ignition Device, 36: Spark Plug, 37: Ignition Coil, 38: Igniter, 39: Fuel Injection Valve, 53: Three-way Catalyst, 80: Electronic Control Unit (ECU).

What is claimed is:

1. A control unit for a multi-cylinder internal combustion engine that is applied to a multi-cylinder internal combustion engine comprising, for each cylinder, a fuel injection valve for direct injection of fuel to a combustion chamber and an ignition device for generating a spark for an ignition in said combustion chamber, and that comprises a control part for performing an automatic stop control in which an injection of fuel from said fuel injection valve to stop the rotation of said engine, when a predetermined automatic stop condition is satisfied, and for restarting said engine by performing an ignition start up control in which a first injection is performed to inject fuel from said fuel injection valve of a cylinder in an expansion stroke and subsequently said ignition device is used to generate a spark for ignition for igniting the fuel injected by the first injection to the combustion chamber of the cylinder in the expansion stroke, and a second injection is performed to inject fuel from said fuel injection valve of a cylinder in a compression stroke and subsequently said ignition device is used to generate a spark for ignition for igniting the fuel injected by the second injection, when a restart demand occurs after the initiation of said automatic stop control, when a restart demand occurs after the initiation of said automatic stop control, wherein:

said control part is configured so as to perform a third injection to re-inject fuel from said fuel injection valve of a cylinder in said compression stroke after said second injection so that a self-ignition of fuel-air mixture does not occur in the cylinder in the compression stroke, when it is judged that a start-up failure in which the crank angle of the cylinder in the compression stroke cannot get over a compression top dead center has occurred or will occur.

2. The control unit for an internal combustion engine according to claim 1, wherein:

said ignition device comprises a primary coil, a secondary coil and a spark plug, and is configured so as to generate said spark for ignition by impressing a high voltage produced in said secondary coil by electrification to said primary coil and interception thereof to an electrode part of said spark plug, and said control part is configured so as to intercept the electrification to the primary coil after a predetermined time has passed since said third injection was performed, in a case where the electrification to said primary coil has been already started in order to generate said spark for ignition for igniting the fuel injected by said second injection at a time point when it is judged that said start-up failure has occurred or will occur.

3. The control unit for an internal combustion engine according to claim 1, wherein said control part is configured so as to:

perform a starter start-up control in which cranking of said engine is carried out by a starter that said engine comprises, as well as, fuel is injected from said fuel injection valve, the injected fuel is ignited by a spark for ignition generated by said ignition device, and the engine is restarted, when it is judged that said start-up failure has occurred or will occur, and decrease the quantity of fuel injected from said fuel injection valve in a predetermined period in a case where there is a history that said third injection has been performed, as compared with that in a case where there is no such a history, after said engine has completed its start-up after the execution of said starter start-up control.

* * * * *

UNITED STATES PATENT AND TRADEMARK OFFICE
CERTIFICATE OF CORRECTION

PATENT NO. : 9,863,389 B2  
APPLICATION NO. : 15/066085  
DATED : January 9, 2018  
INVENTOR(S) : Yusuke Suzuki et al.

Page 1 of 1

It is certified that error appears in the above-identified patent and that said Letters Patent is hereby corrected as shown below:

In the Specification

At Column 17, Line 30, change "MapTFtgt" to "MapTItgt"

Signed and Sealed this  
Fifth Day of June, 2018

Andrei Iancu  
*Director of the United States Patent and Trademark Office*